(12) United States Patent
Kim

(10) Patent No.: US 12,213,627 B2
(45) Date of Patent: Feb. 4, 2025

(54) FOOD PROCESSOR

(71) Applicant: NUC ELECTRONICS CO., LTD., Daegu (KR)

(72) Inventor: Jong Boo Kim, Daegu (KR)

(73) Assignee: NUC ELECTRONICS CO., LTD., Daegu (KR)

( * ) Notice: Subject to any disclaimer, the term of this patent is extended or adjusted under 35 U.S.C. 154(b) by 252 days.

(21) Appl. No.: 17/776,176

(22) PCT Filed: Nov. 15, 2019

(86) PCT No.: PCT/KR2019/015639
§ 371 (c)(1),
(2) Date: May 11, 2022

(87) PCT Pub. No.: WO2021/095939
PCT Pub. Date: May 20, 2021

(65) Prior Publication Data
US 2022/0408976 A1      Dec. 29, 2022

(30) Foreign Application Priority Data
Nov. 12, 2019   (KR) ................. 10-2019-0143948

(51) Int. Cl.
*A47J 43/046*   (2006.01)
*A47J 43/07*   (2006.01)

(52) U.S. Cl.
CPC ......... *A47J 43/0716* (2013.01); *A47J 43/046* (2013.01); *A47J 43/0465* (2013.01); *A47J 43/07* (2013.01)

(58) Field of Classification Search
CPC .................................................. A47J 43/0716
See application file for complete search history.

(56) References Cited

U.S. PATENT DOCUMENTS 5,402,949 A * 4/1995 Berner .................. A47J 43/255
241/199.9
10,299,630 B2    5/2019 Chung
(Continued)

FOREIGN PATENT DOCUMENTS

CN    208510867 U  *  2/2019
CN    109419384 A  *  3/2019
(Continued)

*Primary Examiner* — Jared O Brown

(57) ABSTRACT

A food processor comprises: a housing which includes a container-accommodating chamber; an accommodating tank which is accommodated in the container-accommodating chamber, has an opening portion for inputting food ingredients, and has an accommodating space for accommodating the food ingredients input through the opening portion; a cover which closes the opening portion while coupled to the accommodating tank, and has an air exhaust part communicating with the accommodating space; a vacuum pump which is provided in the housing; and a vacuum port which is configured to be switched between a first state in which the vacuum port is in close contact with the air exhaust part inside the container-accommodating chamber, and a second state in which the vacuum port is spaced apart from the air exhaust part, the vacuum port including an exhaust line for communicatively connecting the vacuum pump and the air exhaust part in the first state.

9 Claims, 7 Drawing Sheets

(56) References Cited

U.S. PATENT DOCUMENTS

2005/0023940  A1     2/2005  Van Beusekom
2020/0353398  A1*   11/2020  Cuaresma, Jr. ....... A47J 43/046

FOREIGN PATENT DOCUMENTS

| CN | 107550218 B | * 10/2022 | ............. A47J 19/02 |
| JP | 2014-217412 A | 11/2014 | |
| KR | 10-0266152 B1 | 9/2000 | |
| KR | 10-1943098 B1 | 1/2019 | |
| WO | 2013/143430 A1 | 10/2013 | |

* cited by examiner

FOOD PROCESSOR

CROSS REFERENCE TO RELATED APPLICATIONS

The present application is a National Phase of International Application No. PCT/KR2019/015639 filed on Nov. 15, 2019, which claims the priority benefit of Korean Patent Application No. 10-2019-0143948, filed on Nov. 12, 2019, in the Korean Intellectual Property Office, the disclosures of which are incorporated herein by reference.

TECHNICAL FIELD

The disclosure relates to a food processor, and more particularly to a food processor for processing a food ingredient.

BACKGROUND ART

There are various food processors for crushing, mixing, juicing, etc. foods.

In general food processors, food to be processed is put into a container and then processed by a processing member (a blade, a screw, etc.).

To prevent food from oxidizing while being processed, the food processors that process food after vacuumizing the container into a negative pressure condition have recently appeared.

Besides, the food processors have been required to have various functions.

DISCLOSURE

Technical Problem

A problem to be solved by the disclosure is to provide a novel food processor having various functions.

The aspects of the disclosure are not limited to the foregoing aspect, and other aspects not mentioned above will become apparent to those skilled in the art from the following descriptions.

Technical Solution

According to an embodiment of the disclosure, there may be provided a food processor including: a housing including a container accommodating chamber, a door for opening and closing a lateral side of the container accommodating chamber, and a driver accommodating chamber; a containing tank put in the container accommodating chamber or taken out of the container accommodating chamber through the lateral side of the container accommodating chamber opened by the door, formed with an opening through which a food ingredient is put therein, and including an accommodating space formed to accommodate the food ingredient put through the opening; a cover detachably coupled to the containing tank, closing the opening while being coupled to the containing tank, and including an exhausting portion formed to communicate with the accommodating space; a vacuum pump provided in the driver accommodating chamber; and a vacuum port switched over between a first state to be in closed contact with the exhausting portion and a second state to be spaced apart from the exhausting portion in the container accommodating chamber, and including an exhausting line by which the vacuum pump and the exhausting portion are connected to communicate with each other in the first state.

Other details of the disclosure are included in the detailed description and the accompanying drawings.

Advantageous Effects

According to embodiments of the disclosure, effects are at least as follows.

There may be provided a food processor with various functions such as vacuumizing, processing, cooling, etc.

A problem that may occur when a user takes a container out of a food processor is prevented in advance.

The effects according to the disclosure are not limited to the foregoing examples, and more various effects are involved in the present specification

BEST MODE

Figure 1:
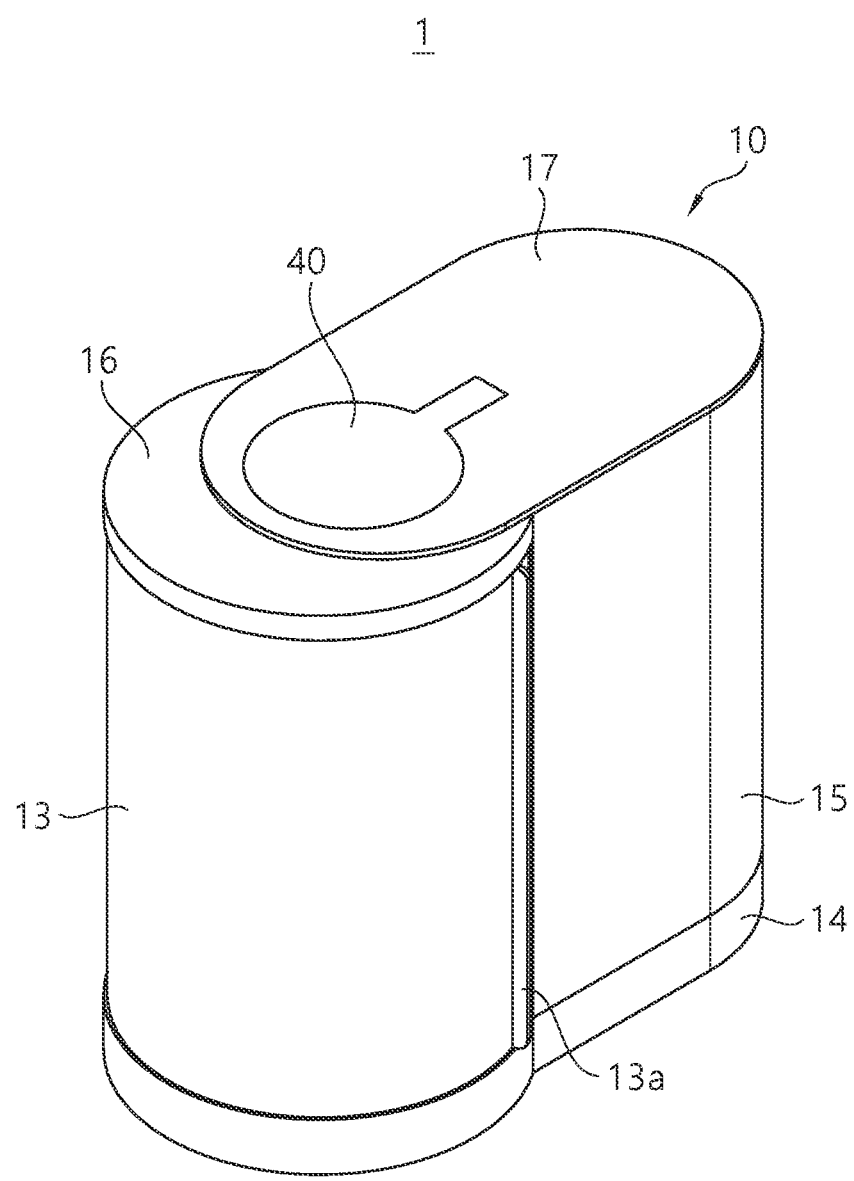
FIG. 1 is a perspective view showing a food processor according to an embodiment of the disclosure.

The merits and characteristics of the disclosure and a method for achieving the merits and characteristics will become more apparent from embodiments described below in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

Further, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Below, the disclosure will be described with reference to the accompanying drawings that illustrates a food processor according to the embodiments of the disclosure.

Figure 2:
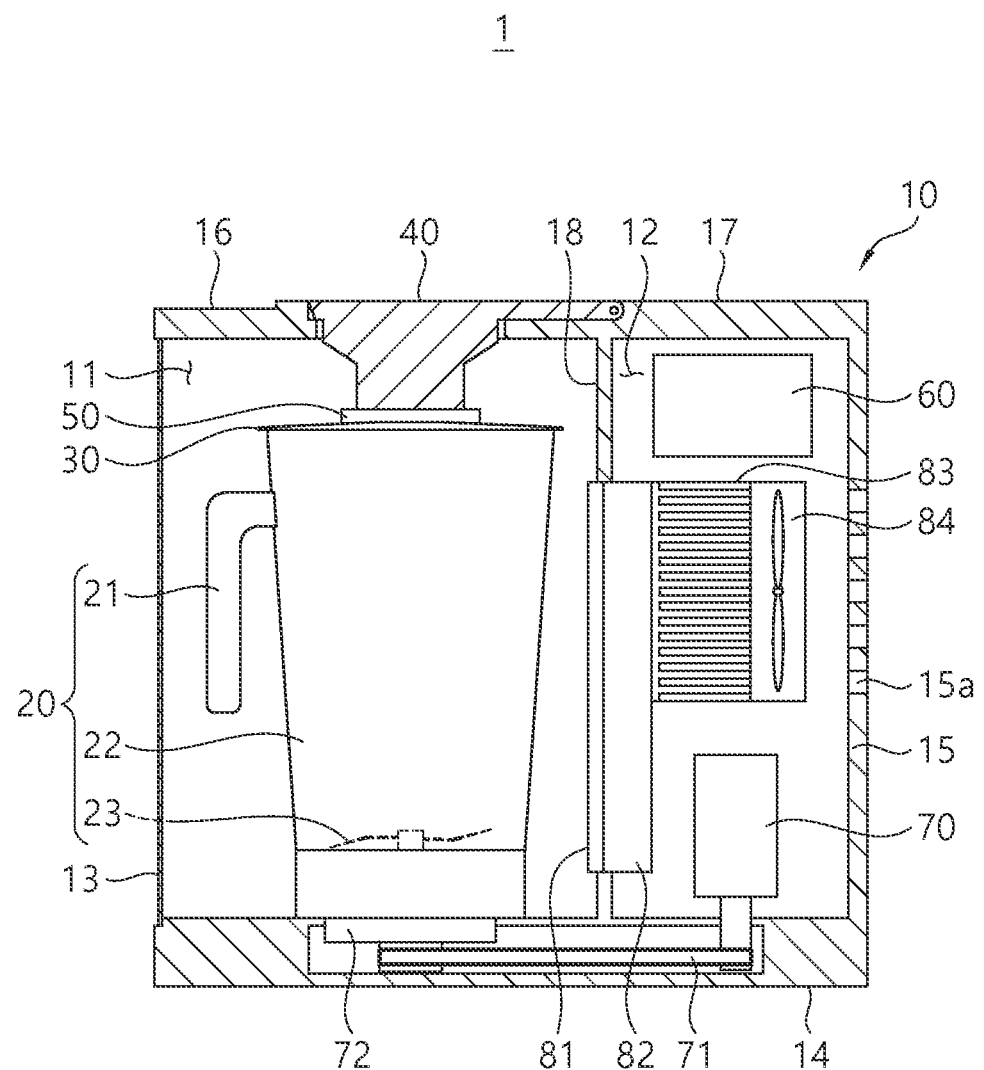
FIG. 2 is a cross-sectional view schematically showing internal elements of a food processor according to an embodiment of the disclosure.

FIG. 1 is a perspective view showing a food processor according to an embodiment of the disclosure, and FIG. 2 is a cross-sectional view schematically showing internal elements of a food processor according to an embodiment of the disclosure.

As shown in FIGS. 1 and 2, a food processor 1 according to an embodiment of the disclosure includes a housing 10 provided with a container accommodating chamber 11 and a driver accommodating chamber 12.

The housing 10 includes a base 14, a driver-accommodating-chamber lateral wall 15, a first roof 16, a second roof 17, and a partition 18.

The base 14 forms the bottoms of the container accommodating chamber 11 and the driver accommodating chamber 12.

The partition 18 divides the container accommodating chamber 11 and the driver accommodating chamber 12 from each other. The container accommodating chamber 11 and the driver accommodating chamber 12 are provided side by side with the partition 18 therebetween.

The first roof 16 may form the ceiling of the container accommodating chamber 11, and the second roof 17 may form the ceiling of the driver accommodating chamber 12. FIGS. 1 and 2 show an example that the first roof 16 and the second roof 17 are separately formed. According to an embodiment, the ceilings of the container accommodating chamber 11 and the driver accommodating chamber 12 may be formed as a single body.

The second roof 17 includes a vacuum port 40 rotatably coupled thereto.

Figure 6:
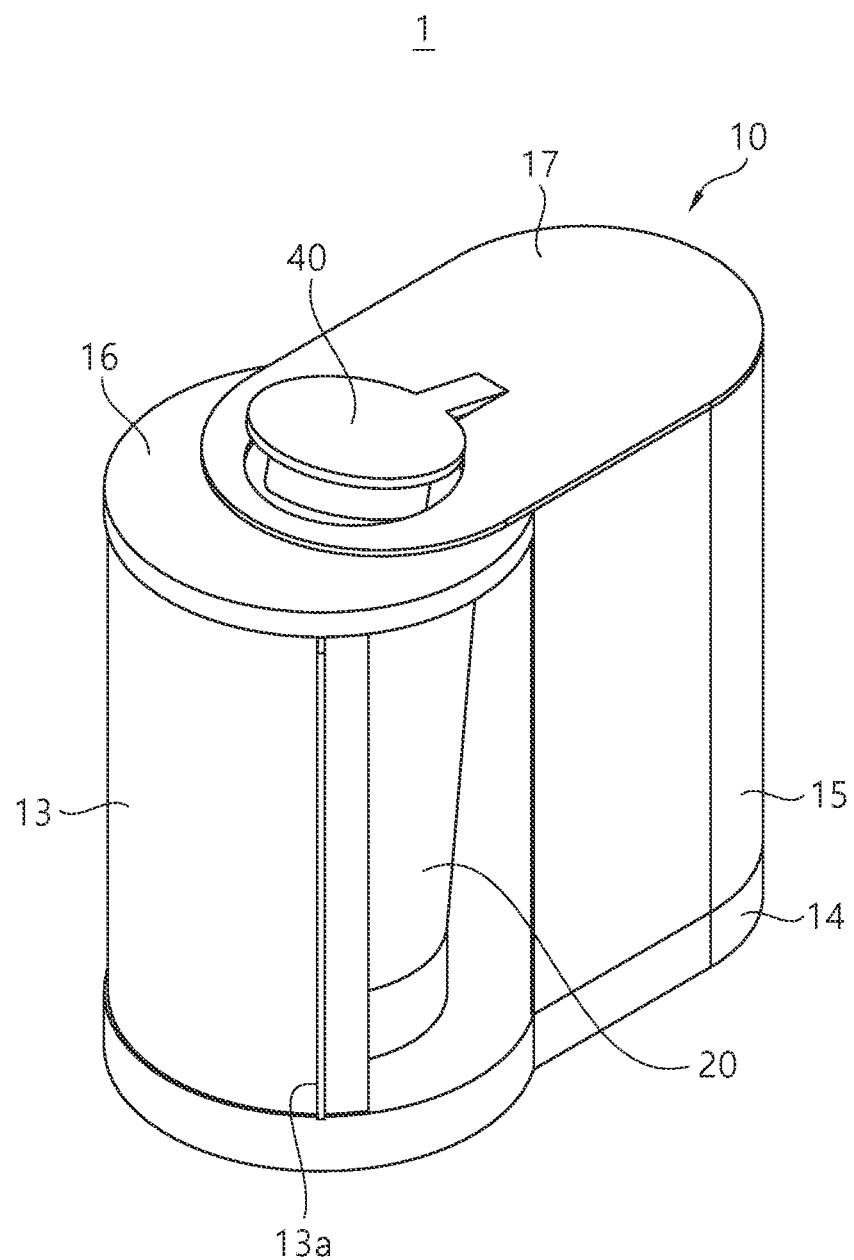
FIG. 6 is a perspective view showing a food processor according to an embodiment of the disclosure in which a vacuum port is in a second state.
Figure 7:
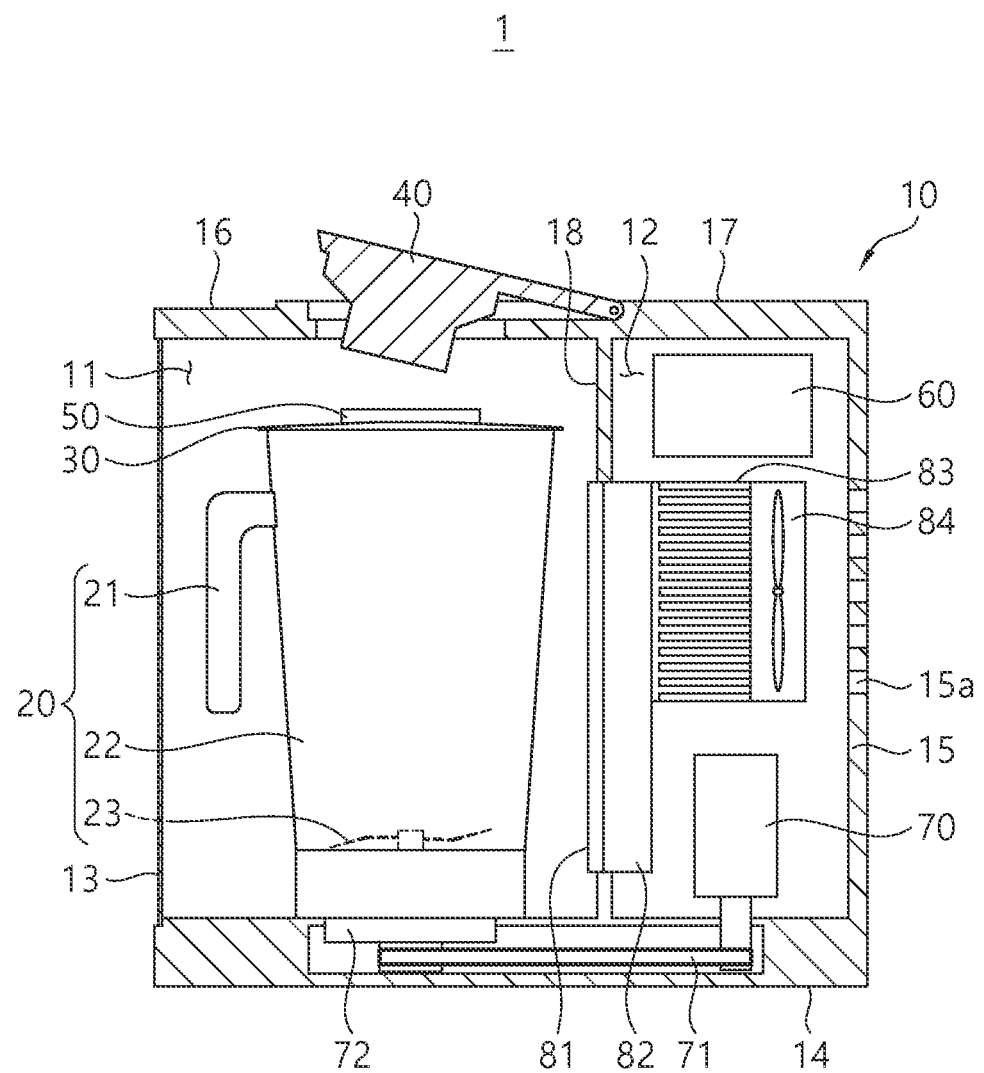
FIG. 7 is a cross-sectional view schematically showing the food processor in the state of FIG. 6.

The vacuum port 40 alternates between a first state (see FIGS. 1 and 2) and a second state (see FIGS. 6 and 7).

In the first state, the vacuum port 40 is in close contact with an exhausting portion 50 of a cover 30.

The vacuum port 40 includes an exhausting line (not shown) through which the exhausting portion 50 of the cover 30 connects and communicates with a vacuum pump 60 in the first state. The vacuum port 40 draws gas from the inside of a containing space of a containing tank 22 toward the vacuum pump 60 through the exhausting portion 50 of the cover 30 based on vacuum pressure generated by the vacuum pump 60 in the first state.

In the second state, the vacuum port 40 is spaced apart from the exhausting portion 50 of the cover 30 (see FIG. 7).

A portion of the vacuum port 40 may form the ceiling of the container accommodating chamber 11 together with the first roof 16.

To this end, the first roof 16 or the second roof 17 may have a space formed to accommodate the vacuum port 40.

As shown in FIG. 1, the first roof 16, the second roof 17, and the vacuum port 40 may form an upper outer appearance of the housing 10. In other words, an upper surface of the vacuum port 40 may be exposed to the top of the housing 10.

The housing 10 includes a door 13 to open and close a portion on a lateral side of the container accommodating chamber 11.

As shown in FIG. 1, the container accommodating chamber 11 may be roughly shaped like a cylinder, and the door 13 may be opened and closed sliding laterally along a curved lateral side of the cylinder (see FIG. 6).

A protrusion 13a protruding outward is formed at one side of the door 13. The protrusion 13a may be used as a grip when a user opens and closes the door 13.

A cooling plate 81 is formed in at least a portion on the lateral side of the container accommodating chamber 11. The cooling plate 81 may also form a portion of the partition 18.

The driver accommodating chamber 12 is provided with a cold energy generator 82 adjacent to the cooling plate 81. The cold energy generator 82 may transfer cold energy to the cooling plate 81 so that the inside of the container accommodating chamber 11 can be maintained in a refrigerated or frozen state. The cold energy generator 82 may employ a Peltier element or the like thermoelectric element. According to an embodiment, the cooling plate 81 may be omitted, and one side of the cold energy generator 82 (a low temperature portion in the Peltier element) may be exposed to at least a portion on the lateral side of the container accommodating chamber 11.

In the driver accommodating chamber 12, heat dissipation units 83 and 84 may be provided adjacent to the cold energy generator 82.

The heat dissipation units 83 and 84 may include a heatsink 83 and a heat dissipation fan 84.

The driver-accommodating-chamber lateral wall 15 is formed with a plurality of heat dissipation holes 15a in front of the heat dissipation fan 84, so that high temperature wind generated by the heat dissipation fan 84 can be discharged to the outside of the housing 10.

The driver accommodating chamber 12 is provided with the vacuum pump 60.

The vacuum pump 60 is connected to the vacuum port 40 and vacuumizes the containing tank 22 by drawing gas out of the containing tank 22 when the vacuum port 40 is in the first state.

The driver accommodating chamber 12 may be provided with a driving motor 70. The output shaft of the driving motor 70 is provided to be exposed toward the base 14.

A magnet 72 may be rotatably provided in the base 14 at a side under the container accommodating chamber 11, and a power transmission member 71 (e.g., a belt, a chain, etc.) for connecting the magnet 72 and the output shaft of the driving motor 70 may be provided in the base 14.

When the driving motor 70 rotates the output shaft, the power transmission member 71 transmits rotational force to the magnet 72 so that the magnet 72 can be rotated.

As shown in FIG. 1, a container 20 may be may be accommodated in the container accommodating chamber 11.

The container 20 may include a handle 21, the containing tank 22, and a processing member 23. The handle 21 and the processing member 23 may be omitted according to the kinds of containers.

The containing tank 22 is formed with an opening at its upper end to put a food ingredient therein, and forms an accommodating space in which the food ingredient put through the opening is accommodated.

The containing tank 22 may include the handle 21 extended outward, and the processing member 23 rotatably installed in the accommodating space.

The processing member 23 is provided to rotate together with the magnet 72 as affected by magnetic force generated from the magnet 72.

The exhausting portion 50 of the cover 30 may include foreign matter trap.

The foreign matter trap prevents foreign matter flowing into the exhausting portion 50 from being introduced into the exhausting line of the vacuum port 40 while the vacuum pump 60 draws gas out of the accommodating space through the exhausting portion 50 and the exhausting line.

Figure 3:
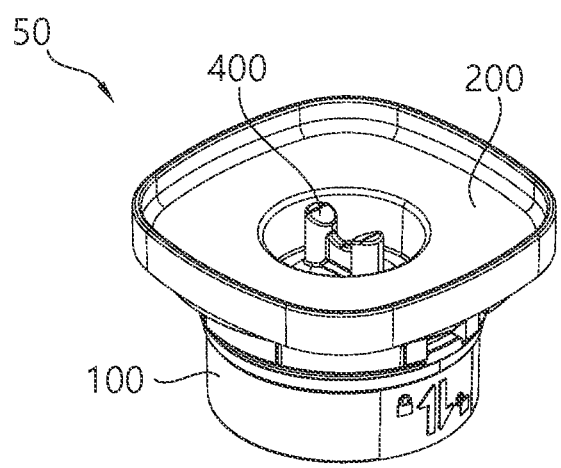
FIG. 3 is an exploded perspective view showing a cover and foreign matter trap in a food processor according to an embodiment of the disclosure.
Figure 3:
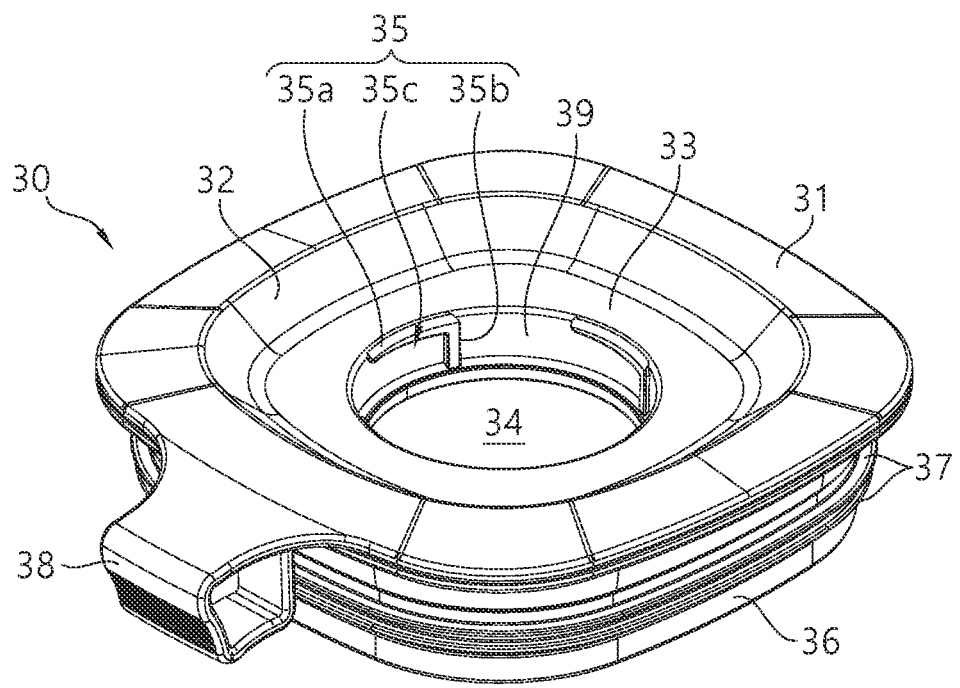
Figure 4:
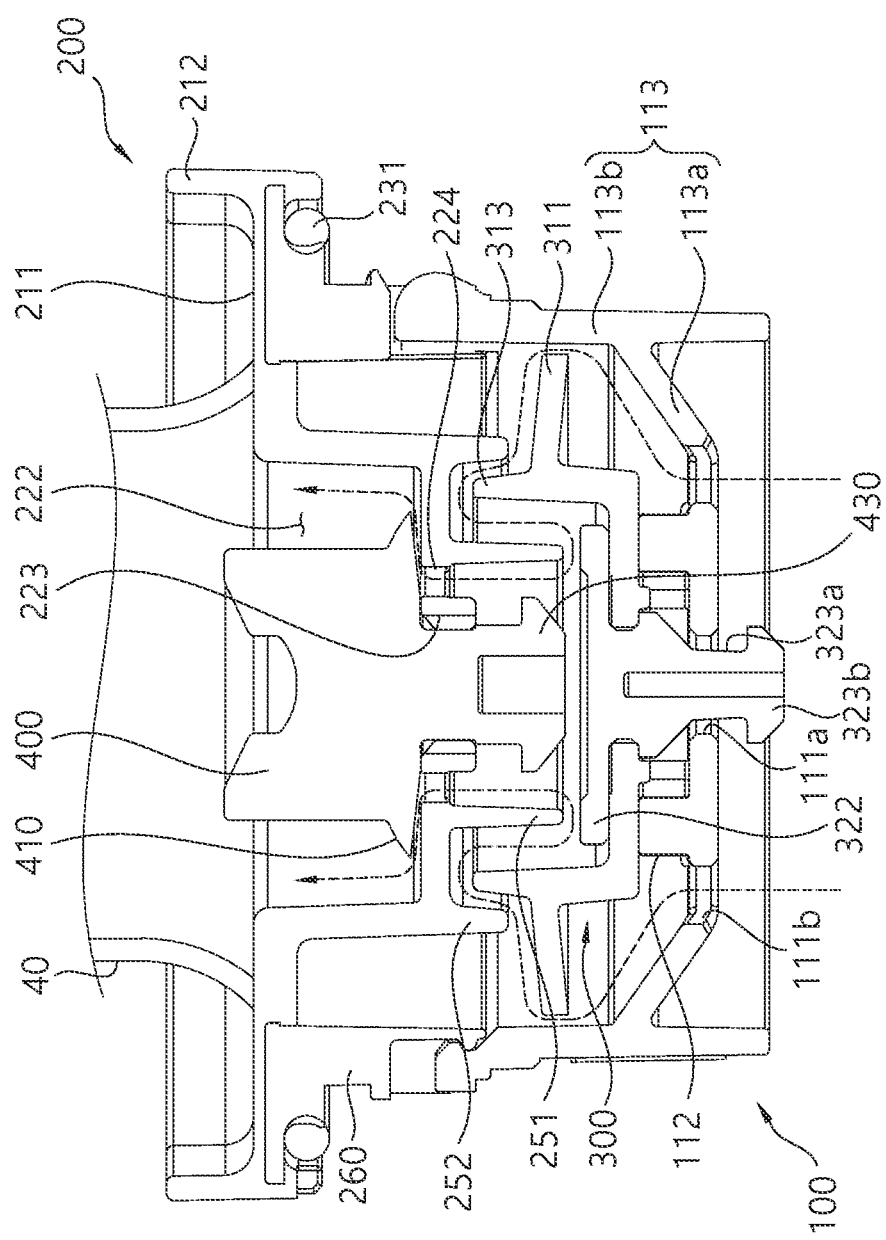
FIG. 4 is a cross-sectional view showing foreign matter trap of which an exhaust channel is opened in a vacuum suction state.
Figure 5:
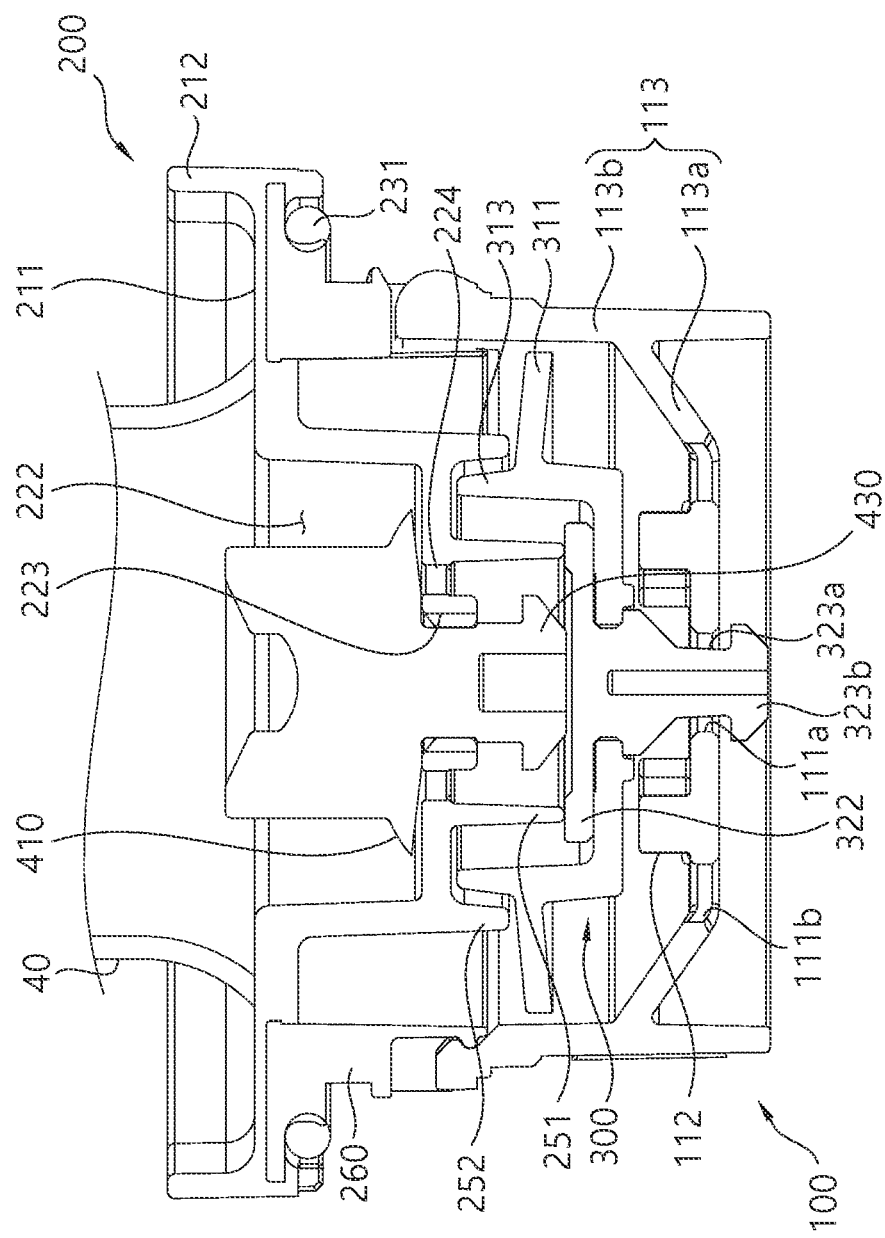
FIG. 5 is a cross-sectional view showing foreign matter trap of which an exhaust channel is closed in a vacuum suction state.

FIG. 3 is an exploded perspective view showing a cover and foreign matter trap in a food processor according to an embodiment of the disclosure, FIG. 4 is a cross-sectional view showing the foreign matter trap of which an exhaust channel is opened in a vacuum suction state, and FIG. 5 is a cross-sectional view showing the foreign matter trap of which the exhaust channel is closed in the vacuum suction state.

As shown in FIG. 3, foreign matter trap 50 is detachably installed in the cover 30. In the state that the foreign matter trap 50 is installed in the cover 30, a second member 200 forming an upper portion of the foreign matter trap 50 is exposed to an upper portion of the cover 30, and a first member 100 forming a lower portion of the foreign matter trap 50 is exposed to a lower portion of the cover 30.

The upper portion of the cover 30 includes a first upper surface 31, a second upper surface 32, and a third upper surface 33. The first upper surface 31 is annularly formed forming an upper edge of the cover 30, the third upper surface 33 is positioned inside the first upper surface 31 and lower than the first upper surface 31, and the second upper surface 32 connects the first upper surface 31 and the second upper surface 32 and forms an inclined surface.

A lateral surface 36 forming the lateral side of the cover 30 is annularly formed along the first upper surface 31, and the outer circumference of the first upper surface 31 is formed to protrude more outward than the lateral surface 36. In addition, the lateral surface 36 is provided with a plurality of sealing rings 37.

Therefore, when the cover 30 is installed in the opening of the containing tank 22, the lateral surface 36 is inserted in the containing tank 22, and the plurality of sealing rings 37 are in close contact with the inner surface of the containing tank 22, thereby preventing food accommodated in the containing tank 22 from leaking out. At the same time, the edge of the first upper surface 31 protruding more outward than the lateral surface 36 is seated on the upper end of the containing tank 22.

The cover 30 includes a flap 38 extended from one side of the first upper surface 31. The flap 38 may be used as a member for locking the cover 30 to the containing tank 22, or a member for allowing a finger or the like to be inserted therein to pull the cover 30 when a user separates the cover 30 from the containing tank 22.

In a central portion of the third upper surface 33, a trap installation hole 34 is formed penetrating the third upper surface 33. The trap installation hole 34 refers to a space where the foreign matter trap 50 is installed. A trap installation platform 35 is formed on an inner wall of the trap installation hole 34 so that the foreign matter trap 50 can be detachably mounted to the trap installation hole 34.

According to an embodiment, the trap installation platform 35 includes a pressing projection 35a protruding by a predetermined length in a horizontal direction, and a blocking projection 35b protruding from the pressing projection 35a in a substantially vertical direction. As shown in FIG. 3, a locking-portion accommodating space 35c, in which a locking piece (not shown) of the foreign matter trap 50 is accommodated, is formed between the pressing projection 35a and the blocking projection 35b.

When the foreign matter trap 50 is installed in the trap installation platform 35, the locking portion of the foreign matter trap 50 enters from one side of the pressing projection 35a into the blocking projection 35b. In the embodiment shown in FIG. 3, the foreign matter trap 50 is partially inserted in the trap installation platform 35, and then the foreign matter trap 50 is rotated clockwise so that the locking portion can be moved from one side of the pressing projection 35a toward the blocking projection 35b.

As shown in FIG. 3, the pressing projection 35a is formed to lower the height of the locking-portion accommodating space 35c as approaching the blocking projection 35b, and therefore the locking portion is pressed by the pressing projection 35a and locks the foreign matter trap 50 in the trap installation platform 35. However, due to the presence of the blocking projection 35b, the foreign matter trap 50 is allowed to rotate clockwise only until the locking portion is blocked by the blocking projection 35b. Therefore, regardless of a user's force, the foreign matter trap 50 is installed in the same direction with respect to the cover 30.

To separate the foreign matter trap 50 from the cover 30, a user rotates the foreign matter trap 50 counterclockwise until the locking portion is released from the pressing projection 35a and lifts and separates the foreign matter trap 50 from the cover 30.

With this structure shown in FIG. 3, not only it is easy to attach or detach the foreign matter trap 50 to and from the cover 30 when the foreign matter trap 50 is required to undergo cleaning or the like, but also it is possible to remove the foreign matter trap 50 from the cover 30 and insert a push rod (not shown) in the containing tank 22 through the trap installation hole 34 when a food ingredient is needed to be forcibly moved toward the processing member 23 or pressed in the containing tank 22.

Meanwhile, as shown in FIGS. 4 and 5, the foreign matter trap 50 according to an embodiment of the disclosure includes the first member 100, the second member 200, a movable member 300, and a check valve 400. The first member 100 forms the lower portion of the foreign matter trap 50, and the second member 200 forms the upper portion of the foreign matter trap 50. The check valve 400 is coupled to the second member 200, and the movable member 300 is movably provided between the first member 100 and the second member 200.

The second member 200 includes a port contact surface 211.

The port contact surface 211 may be formed as an approximately horizontal surface, and a ridge 212 is extended upward along the outer circumference of the port contact surface 211. The port contact surface 211 forms a surface with which the vacuum port 40 (see FIG. 2) is in close contact in the first state.

In a central portion of the port contact surface 211, a check-valve accommodating hole 222 is formed. The check-valve accommodating hole 222 is extended from the port contact surface 211 in an approximately vertically downward direction. An installation platform accommodating hole 223 and an exhaust channel outlet 224 are formed on the bottom of the check-valve accommodating hole 222. A plurality of exhaust channel outlets 224 may be formed around the installation platform accommodating hole 223.

Under the bottom 225, a first downward protruding ring 251 and the second downward protruding ring 252 are extended downward. The first downward protruding ring 251 is formed to surround the exhaust channel outlet 224, and the second downward protruding ring 252 is formed to surround the first downward protruding ring 251. The first downward protruding ring 251 is formed to protrude more downward than the second downward protruding ring 252.

Under the port contact surface 211, a lateral wall 260 is formed to protrude downward surrounding the second downward protruding ring 252. The lateral wall 260 is provided with a sealing ring 231. The sealing ring 231 is in contact with the third upper surface 33 (see FIG. 3) when the foreign matter trap 50 is installed in the cover 30, and seals a space between the trap installation hole 34 and the foreign matter trap 50 to prevent the loss of vacuum pressure.

The check valve 400 includes an opening/closing wing 410, a grip 420, and an installation platform 430.

As shown in FIG. 4, the check valve 400 includes the opening/closing wing 410, and the installation platform 430.

The opening/closing wing 410 has a flat bottom and an arc-shaped upper surface, and is made of an elastic material.

Therefore, the opening/closing wing 410 is elastically transformed more easily toward a periphery than a central portion.

The installation platform 430 is extended downward from the central portion of the opening/closing wing 410.

The installation platform 430 may be formed to have a multistage structure where the diameter increases downward. The uppermost portion of the installation platform 430 is formed to have a smaller diameter than the inner diameter of the installation platform accommodating hole 223, but the lowermost portion of the installation platform 430 is formed to be larger than the inner diameter of the installation platform accommodating hole 223 and positioned to be exposed to the lower portion of the installation platform accommodating hole 223, thereby preventing the check valve 400 from being separated from the second member 200.

The central portion of the installation platform 430 may be formed to have the same size as the inner diameter of the installation platform accommodating hole 223, or may be formed to have an intermediate fitting tolerance with respect to the installation platform accommodating hole 223. Therefore, in the state that the check valve 400 is lifted and the central portion of the installation platform 430 is fitted into the installation platform accommodating hole 223, the check valve 400 does not fall by its own weight but is maintained as it is lifted. In this state, the opening/closing wing 410 is spaced apart from the exhaust channel outlet 224, and the check valve 400 does not fall by its own weight, thereby maintaining the exhaust channel outlet 224 opened.

The first member 100 includes bottoms 111a, 111b and 112 and a lateral wall 113.

The bottom is formed with a lifting-shaft accommodating hole 111a, a fluid inlet hole 111b, and a spacer 112. The lifting-shaft accommodating hole 111a is formed penetrating the central portion of the bottom, and the plurality of fluid inlet holes 111b are radially formed around the lifting-shaft accommodating hole 111a. The plurality of spacers 112 are formed protruding upward from the bottom by a certain height. The spacers 112 may be formed between the lifting-shaft accommodating hole 111a and the fluid inlet hole 111b. According to an alternative embodiment, the spacer 112 may be formed between the fluid inlet holes 111b.

The lateral wall 113 is extended upward from the bottom 111, and includes an inclined portion 113a extended upward forming a slope from the outside of the bottom 111 and.

The inclined portion 113a moves foreign matter, which is blocked by foreign matter shield 311 (to be described later), toward the fluid inlet hole 111b. To smoothly discharge foreign matter, the fluid inlet hole 111b may be formed adjacent to the inclined portion 113a, or the fluid inlet hole 111b may be partially formed in the inclined portion 113a.

As shown in FIGS. 4 and 5, the lateral wall 113 may be partially extended more downward than the bottom while surrounding the inclined portion 113a and the bottom. The lower end of the lateral wall 113 formed to surround the outer side of the bottom 111 prevents foreign matters from being splashed and introduced into the fluid inlet hole 111b due to a vortex or the like as food inside the containing tank 22 is rotated in the containing tank 22 by the rotation of the processing member 23.

The movable member 300 includes the foreign matter shield 311 approximately shaped like a ring-shaped plate.

The outer diameter of the foreign matter shield 311 is smaller than the inner diameter of the lateral wall 113b of the first member 100, but is formed such that the edge of the foreign matter shield 311 can be positioned adjacent to the lateral wall 113b in the state that the movable member 300 is installed in the first member 100. For example, a gap between the foreign matter shield 311 and the lateral wall 113b may be less than 2 mm.

The movable member 300 includes an upward protruding ring 313 formed to annularly protrude from the upper surface of the foreign matter shield 311, a blocking plate 322 provided inside the upward protruding ring 313, a lifting shaft 323a extended downward from the blocking plate 322, and a separation preventing end 323b.

The lifting shaft 323a is formed to have an outer diameter smaller than the inner diameter of the lifting-shaft accommodating hole 111a of the first member 100. There is a gap between the lifting-shaft accommodating hole 111a and the lifting shaft 323a, so that the movable member 300 can freely move up and down with respect to the first member 100 as long as the lifting shaft 323a is positioned inside the lifting-shaft accommodating hole 111a.

The separation preventing end 323b is extended from the lower end of the lifting shaft 323a and formed to have a larger diameter than the lifting shaft 323a while having a diameter difference from the lifting shaft 323a. The separation preventing end 323b is placed under the lifting-shaft accommodating hole 111a of the first member 100 and prevents the movable member 300 from being separated from the first member 100.

As shown in FIG. 4, the vacuum port 40 is in close contact with the port contact surface 211 so as to surround the check-valve accommodating hole 222 in the vacuum suction state (i.e., the first state). Although it is not shown, the vacuum port 40 may include an element for pressing the check valve 400 downward in the first state. In the state that the check valve 400 is pressed downward, vacuum pressure is applied from the vacuum pump 60 through the vacuum port 40, and therefore the edge of the opening/closing wing 410 is elastically transformed and lifted upward by the vacuum pressure, thereby opening the exhaust channel outlet 224.

Therefore, gas inside the containing tank 22 is discharged along the exhaust channel formed in a space between the fluid inlet hole 111b, the foreign matter shield 311, and the lateral wall 113b, a space between the second downward protruding ring 252 and the upward protruding ring 313, and a space between the first downward protruding ring 251 and the upward protruding ring 313, and connected to the exhaust channel outlet 224, thereby vacuumizing the containing tank 22.

While the containing tank 22 is vacuumized in the state of FIG. 4, liquid or the like in the containing tank 22 may flow into the foreign matter trap 50. For example, a food ingredient may be splashed and introduced into the fluid inlet hole 111b while food is processed, or bubbles generated while food is processed may rise and flow into the fluid inlet hole 111b.

When liquids and the like foreign matters enter the vacuum pump 60, the vacuum pump 60 is likely to be damaged. Therefore, the foreign matter trap 50 prevents foreign matters such as liquids, etc. from flowing into the vacuum pump 60.

When solid foreign matters are introduced into the fluid inlet hole 111b, the solid foreign matters fall again into the containing tank 22 or remain on the bottom of the first member 100 through the fluid inlet hole 111b along the inclined portion 113a by their own weight.

Although solid foreign matters move along the exhaust channel as affected by vacuum pressure, the gap between the foreign matter shield 311 and the lateral wall 113b of the first member 100 is so narrow that the solid foreign matters cannot pass this gap. Therefore, the solid foreign matters are blocked by the foreign matter shield 311 and eventually fall again into the containing tank 22 or remain on the bottom of the first member 100 through the fluid inlet hole 111*b* along the inclined portion 113*a* by its own weight.

When a large amount of liquid foreign matters such as bubbles is introduced into the fluid inlet hole 111*b*, the movable member 300 rises due to buoyancy in the liquid foreign matters as shown in FIG. 5, and the blocking plate 322 of the movable member 300 comes into contact with the first downward protruding ring 251, thereby partially closing the exhaust channel. Therefore, vacuumizing using the exhaust channel is stopped, thereby preventing the liquid foreign matter from reaching the vacuum pump 60.

In this embodiment, only the contact between the blocking plate 322 of the movable member 300 and the first downward protruding ring 251 is carried out to close the exhaust channel. According to an alternative embodiment, when the movable member 300 rises, the upward protruding ring 313 may come into contact with the first downward protruding ring 251 and/or the second downward protruding ring 252 to primarily close the exhaust channel, and at the same time the blocking plate 322 may come into contact with the first downward protruding ring 251 to secondarily close the exhaust channel. In this case, the exhaust channel is closed in two ways, and therefore foreign matter is more effectively blocked. To this end, the upward protruding ring 313 may be shaped like a wedge of which a cross-sectional area decreases upward.

When a small amount of liquid foreign matters is introduced into the fluid inlet hole 111*b* as liquid is splashed while food is processed, the movable member 300 cannot have buoyancy and rise. Therefore, a small amount of liquid foreign matters can move along the exhaust channel, but the gap between the foreign matter shield 311 and the lateral wall 113*b* of the first member 100 is so narrow that the liquid foreign matters can form a liquid film in the gap between the foreign matter shield 311 and the lateral wall 113*b* without passing through this gap.

Because the liquid film is formed in the gap between the foreign matter shield 311 and the lateral wall 113*b*, the movable member 300 rises due to difference in pressure between an upper side and a lower side, and the blocking plate 322 of the movable member 300 comes into contact with the first downward protruding ring 251 as shown in FIG. 5, thereby partially closing the exhaust channel. Therefore, vacuumizing using the exhaust channel is stopped, thereby preventing the liquid foreign matter from reaching the vacuum pump 60.

In a case of using a powder-type food ingredient, a dust filter (not shown) may be additionally provided to prevent the powder-type food ingredient from flowing into the fluid inlet hole 111*b* and reaching the vacuum pump 60.

The dust filter may be provided in the fluid inlet hole 111*b*, and prevent the powder-type food ingredient from flowing into the foreign matter trap 50 through the fluid inlet hole 111*b*.

Alternatively, the dust filter may be installed between the second member 200 and the movable member 300, and provided to cross the exhaust channel in the state the second member 200 and the movable member 300 are assembled, thereby preventing the powder-type food ingredient from passing through the exhaust channel.

Alternatively, the dust filter may be installed on the bottom of the check-valve accommodating hole 222 or in the exhaust channel outlet 224, thereby preventing the powder-type food ingredient introduced into the foreign matter trap 50 from being discharged through the exhaust channel outlet 224.

Alternatively, the dust filter may be installed on the port contact surface 211 of the second member 200, thereby preventing the powder-type food ingredient discharged through the exhaust channel outlet 224 from entering the vacuum pump 60.

Meanwhile, in the state that the vacuum port 40 is removed (i.e., in the second state), the upper side of the opening/closing wing 410 is in an atmospheric pressure state and the exhaust channel is in a negative pressure state. Due to such pressure difference, the opening/closing wing 410 closes the exhaust channel outlet 224. Therefore, the negative pressure in the containing tank 22 is maintained.

A user may place the container in the container accommodating chamber 11 and then close the door 13, thereby closing the container accommodating chamber 11.

As necessary, a user may operate the vacuum pump 60 to vacuumize the containing tank 22.

Further, as necessary, a user may operate the driving motor 70 to process (e.g., crush) a food ingredient in the containing tank 22 by the processing member 23. In this case, the driving motor 70 operates to rotate the magnet 72 and the processing member 23 rotates together with the magnet 72 based on the magnetic force of the magnet 72 even though the processing member 23 is not mechanically connected to the driving motor 70 and the magnet 72, thereby processing the food ingredient in the containing tank 22.

According to an embodiment, the processing member 23 in the containing tank 22 rotates based on the magnetic force, and thus there are no needs of efforts to couple the output shaft of the motor and the rotary shaft of the processing member in a conventional food processor. Further, the processing member 23 is rotatable only by placing the container above the magnet 72 regardless of a placing direction of the container. In addition, it is possible to solve problems of sealing and insanitation caused by the rotation of the rotary shaft (e.g., wear fragment generated while the rotary shaft is rotating) in the conventional container as the rotary shaft of the processing member penetrates the containing tank and is exposed to the bottom of the containing tank so as to couple with the output shaft of the motor.

Further, as necessary, a user may operate the cold energy generator 82 to lower the temperature inside the container accommodating chamber 11, so that a food ingredient can be processed or the processed food ingredient can be stored at a low temperature according to the characteristics of the food ingredient put in the containing tank 22 or a user's tastes.

According to an embodiment, the food processor 1 is more effective in maintaining the low temperature because the container accommodating chamber 11 is closed by the door 13 or the like.

FIG. 6 is a perspective view showing a food processor according to an embodiment of the disclosure in which a vacuum port is in a second state, and FIG. 7 is a cross-sectional view schematically showing the food processor in the state of FIG. 6.

As shown in FIG. 6, a user may open the door 13 and take the container 20 out of the container accommodating chamber 11.

The food processor 1 may be structured to make the vacuum port 40 pop up when a user opens the door 13.

As described above, the vacuum port 40 is maintained in close contact with the exhausting portion (or the foreign matter trap 50) of the cover 30 in the first state. To easily and safely take out the container 20, the vacuum port 40 needs to be switched over to the second state before a user opens the door 13 and takes the container 20 out of the container accommodating chamber 11.

If a user takes the container 20 out of the container accommodating chamber 11 without switching the vacuum port 40 over to the second state before taking out the container 20, it is not easy to take out the container 20 because the vacuum port 40 and the cover 30 are in close contact with each other while the vacuum port 40 is maintained in the first state. If the container 20 is forcibly taken out, food inside the containing tank 22 may spill out or the vacuum port 40 may be broken while the cover 30 or the exhausting portion 50 is separated from the containing tank 22.

Accordingly, the food processor 1 according to an embodiment may be structured such that the vacuum port 40 automatically switches over to the second state while popping up as a user opens the door 13.

To this end, the food processor 1 includes a sensor (not shown) for detecting whether the door 13 is opened or closed, and is thus structured such that the vacuum port 40 pops up when the sensor detects that the door 13 operates to open the container accommodating chamber 11.

The vacuum port 40 may be structured to switch over to the second state while popping up by elasticity of a spring or the like elastic member. In other words, the elastic member is storing elasticity when the vacuum port 40 is in the first state, the housing 10 includes a holding means for maintain the vacuum port 40 in the first state, the holding means releases the vacuum port 40 from being maintained in the first state when the sensor detects that the door 13 operates to open the container accommodating chamber 11, and the elastic member makes the vacuum port 40 pop up with the stored elasticity.

Alternatively, without using the sensor, a mechanical structure for physically connecting the door and the holding means is provided such that the holding means releases the vacuum port 40 from being maintained in the first state as the door 13 is opened, and the elastic member makes the vacuum port 40 pop up with the stored elasticity.

Alternatively, to make the vacuum port 40 pop up, a motor or the like motive element may be used instead of using the elastic member.

As described above, the food processor 1 according to an embodiment of the disclosure is structured such that the vacuum port 40 automatically switches over to the second state while popping up as a user opens the door 13, and it is therefore possible to prevent problems that may occur when a user takes the container 20 out of the container accommodating chamber 11 without switching the vacuum port 40 over to the second state.

Alternatively, the food processor 1 may be structured such that the vacuum port 40 is not maintained in the first state while the door 13 does not close the container accommodating chamber 11.

To this end, the holding means may be structure to maintain the vacuum port 40 in the first state only when the sensor detects that the door 13 is closed.

In the case of including the mechanical structure for physically connecting the door and the holding means without using the sensor, the holding means may be structured to maintain the vacuum port 40 in the first state only by the operation of closing the door 13.

In the case where a motor or the like motive element is used instead of using the elastic member to make the vacuum port 40 pop up, the motive element may be structured to provide motive power for switching the vacuum port 40 over to the first state under the condition that the door is closed.

Meanwhile, the food processor 1 may be structured such that the door 13 cannot close the container accommodating chamber 11 when the vacuum port 40 is not in the first state.

In other words, the door 13 is not closed as long as the vacuum port 40 is in the second state.

To this end, the holding means for maintaining the vacuum port 40 in the first state is linked to the door 13, and an obstructing element for preventing the door 13 from being closed when the holding means does not maintain the vacuum port 40 in the first state may be located on a path of opening/closing the door 13.

Meanwhile, the food processor 1 may be structured such that the vacuum port 40 is switched over from the second state to the first state when the container 20 being accommodated in the container accommodating chamber 11 is seated on the base 14. In this case, the vacuum port 40 may not be switched over to the first state or maintained in the first state when the container 20 is not accommodated in the container accommodating chamber 11 or not seated on the base 14. In this case, switching the vacuum port 40 over between the first state and the second state may not interlock with the opened/closed state of the door 13.

To this end, the food processor 1 may include a sensor or switch for detecting whether the container 20 is present inside the container accommodating chamber 11, or whether the container 20 is seated on the base 14, and include a motive element for automatically switching the vacuum port 40 over from the second state to the first state according to sensing results of the sensor or the state of the switch.

Alternatively, the obstructing element may be additionally provided not to maintain the vacuum port 40 in the first state, and the food processor 1 may be structured such that the obstructing element is activated to obstruct maintaining the vacuum port 40 in the first state when the container 20 is absent inside the container accommodating chamber 11 or is not seated on the base 14.

The obstructing element may be provided as a switch that appears and disappears according to the locations of the container 20. For example, when the container 20 is absent inside the container accommodating chamber 11 or not seated on the base 14, the obstructing element may protrude on the path of switching the vacuum port 40 from the second state to the first state, thereby preventing the vacuum port 40 from being switched over from the second state to the first state.

It will be understood by a person having ordinary knowledge in the art to which the disclosure pertains that the disclosure may be embodied in other specific forms without changing the technical spirit or essential features. Therefore, it should be understood that the foregoing embodiments are for illustrative purposes only and not restricted in all aspects. The scope of the disclosure is defined by the following claims rather than the foregoing detailed description, and all changes or modifications from the meaning and scope of the claims and their equivalents should be construed as being included in the scope of the disclosure.

Mode for Invention

According to an embodiment of the disclosure, a food processor includes: a housing including a container accommodating chamber, a door for opening and closing a lateral side of the container accommodating chamber, and a driver accommodating chamber; a containing tank put in the container accommodating chamber or taken out of the container accommodating chamber through the lateral side of the container accommodating chamber opened by the door, formed with an opening through which a food ingredient is put therein, and including an accommodating space formed to accommodate the food ingredient put through the opening; a cover detachably coupled to the containing tank, closing the opening while being coupled to the containing tank, and including an exhausting portion formed to communicate with the accommodating space; a vacuum pump provided in the driver accommodating chamber; and a vacuum port switched over between a first state to be in closed contact with the exhausting portion and a second state to be spaced apart from the exhausting portion in the container accommodating chamber, and including an exhausting line by which the vacuum pump and the exhausting portion are connected to communicate with each other in the first state.

The vacuum port may be switched over between the first state and the second state by interlocking with opened and closed states of the door.

The vacuum port may be switched over from the first state to the second state as the door opens the container accommodating chamber.

The door may not close the container accommodating chamber unless the vacuum port is in the first state.

The vacuum port may not be maintained in the first state unless the door closes the container accommodating chamber.

The lateral side of the container accommodating chamber may include a curved surface, and the door is laterally opened and closed along the curved surface.

The exhausting portion may include foreign matter trap to prevent foreign matter introduced into the exhausting portion from flowing into the exhausting line while the vacuum pump draws gas out of the accommodating space through the exhausting portion and the exhausting line.

The containing tank may include a processing member provided to be rotatable to process the food ingredient inside the accommodating space, the food processor further including a magnet provided under the container accommodating chamber and providing magnetic force that affects the processing member; and a driving motor provided in the driver accommodating chamber and rotating the magnet.

The food processor may further include: a cooling plate provided in at least a portion on the lateral side of the container accommodating chamber; and a cold energy generator provided in the driver accommodating chamber and transferring cold energy to the cooling plate.

The food processor may further include a heat dissipation unit to discharge heat generated from the cold energy generator to the outside of the housing.

The invention claimed is:

1. A food processor comprising:
    a housing comprising a container accommodating chamber, a door for opening and closing a lateral side of the container accommodating chamber, and a driver accommodating chamber;
    a containing tank put in the container accommodating chamber or taken out of the container accommodating chamber through the lateral side of the container accommodating chamber opened by the door, formed with an opening through which a food ingredient is put therein, and comprising an accommodating space formed to accommodate the food ingredient put through the opening and a processing member provided to be rotatable to process the food ingredient inside the accommodating space;
    a cover detachably coupled to the containing tank, closing the opening while being coupled to the containing tank, and comprising an exhausting portion formed to communicate with the accommodating space;
    a vacuum pump provided in the driver accommodating chamber;
    a vacuum port switched over between a first state to be in closed contact with the exhausting portion and a second state to be spaced apart from the exhausting portion in the container accommodating chamber, and connected to communicate with the vacuum pump and the exhausting portion in the first state;
    a cooling plate provided in a vertical wall partly defining the container accommodating chamber; and
    a cold energy generator provided in the driver accommodating chamber and transferring cold energy to the cooling plate.

2. The food processor of claim 1, wherein the vacuum port is switched over between the first state and the second state by interlocking with opened and closed states of the door.

3. The food processor of claim 2, wherein the vacuum port is switched over from the first state to the second state as the door opens the container accommodating chamber.

4. The food processor of claim 2, wherein the door does not close the container accommodating chamber unless the vacuum port is in the first state.

5. The food processor of claim 2, wherein the vacuum port is not maintained in the first state unless the door closes the container accommodating chamber.

6. The food processor of claim 1, wherein the lateral side of the container accommodating chamber comprises a curved surface, and the door is laterally opened and closed along the curved surface.

7. The food processor of claim 1, wherein the exhausting portion comprises a foreign matter trap to prevent foreign matter introduced into the exhausting portion from flowing into the vacuum port while the vacuum pump draws gas out of the accommodating space through the exhausting portion and the vacuum port.

8. The food processor of claim 1, further comprising:
    a magnet provided under the container accommodating chamber and providing magnetic force that affects the processing member; and
    a driving motor provided in the driver accommodating chamber and rotating the magnet.

9. The food processor of claim 1, further comprising a heat dissipation unit to discharge heat generated from the cold energy generator to an outside of the housing.

* * * * *